(No Model.)

J. W. T. CADETT.

MACHINE FOR COATING GLASS AND OTHER SURFACES WITH PHOTOGRAPHIC EMULSIONS.

No. 414,015. Patented Oct. 29, 1889.

Witnesses

Inventor

James William Thomas Cadett (No Model.)  2 Sheets—Sheet 2.

J. W. T. CADETT.
MACHINE FOR COATING GLASS AND OTHER SURFACES WITH PHOTOGRAPHIC EMULSIONS.

No. 414,015.  Patented Oct. 29, 1889.

Witnesses.
Walter Allen
Geo. L. Wheelock

Inventor.
J. W. T. Cadett
by Herbert W. T. Jenner
Attorney

N. PETERS, Photo-Lithographer, Washington, D.C.

UNITED STATES PATENT OFFICE.

JAMES WILLIAM THOMAS CADETT, OF ASHSTEAD, COUNTY OF SURREY, ENGLAND.

MACHINE FOR COATING GLASS AND OTHER SURFACES WITH PHOTOGRAPHIC EMULSIONS.

SPECIFICATION forming part of Letters Patent No. 414,015, dated October 29, 1889.

Application filed June 25, 1888. Serial No. 278,198. (No model.) Patented in England July 31, 1886, No. 9,886.

*To all whom it may concern:*

Be it known that I, JAMES WILLIAM THOMAS CADETT, photographic chemist, a subject of the Queen of Great Britain, residing at Greville Works, Ashstead, county of Surrey, England, have invented new and useful Improvements in Machines for Coating Glass and other Surfaces with Photographic Emulsions, (for which I have obtained a patent in Great Britain, No. 9,886, bearing date July 31, 1886,) of which the following is a specification.

This invention relates to coating-machines; and it consists in the novel construction and combination of the parts, as hereinafter fully described and claimed, whereby an even film of photographic emulsion is spread upon the surface of glass or other material.

Figure 1:
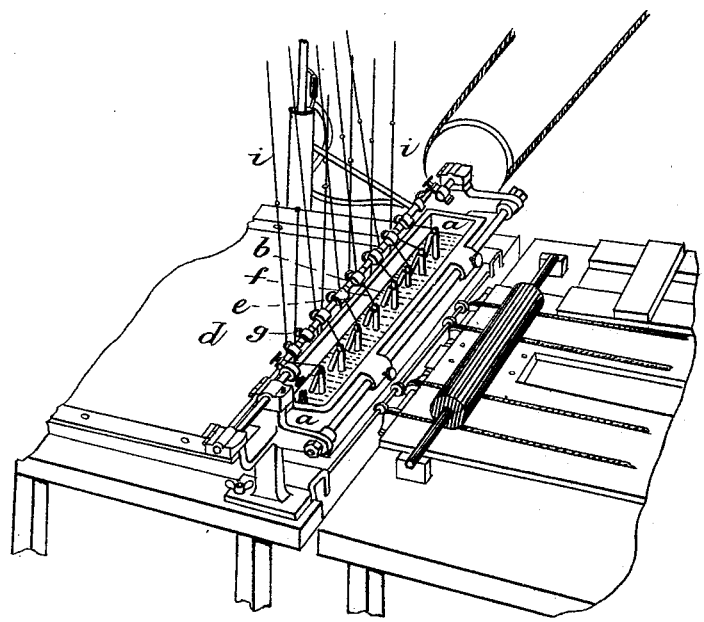
Figure 2:
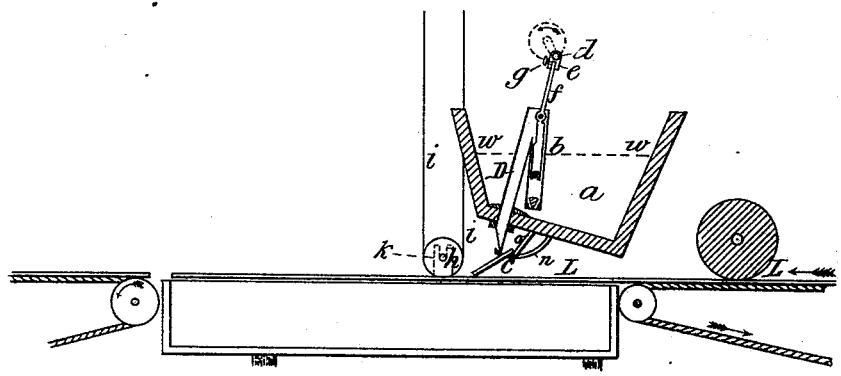
Figure 3:
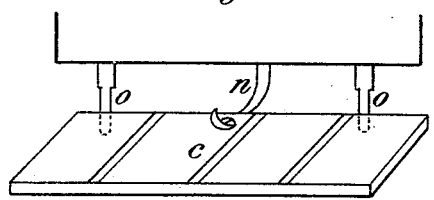
Figure 4:
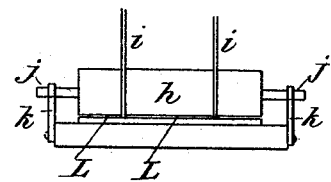
Figure 5:
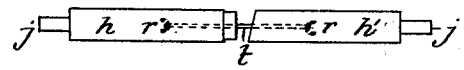

In the drawings, Figure 1 is a perspective view of the apparatus. Fig. 2 is a vertical longitudinal section through the distributing apparatus. Fig. 3 is a detail perspective view of the guide-plate. Fig. 4 is a detail view of the distributing-roller, and Fig. 5 shows a modification in the construction of said roller.

A trough $a$ is provided and is filled with photographic emulsion up to the level of line $w$ $w$. A crank-shaft $d$ extends across the top of the tank and has its ends journaled in suitable bearings. A series of lift-pumps $b$ is arranged in tank $a$, and these pumps are provided with valves of any approved construction, and delivery-chutes D extending through the bottom of the tank.

L is the surface to be coated, which is carried slowly under the tank in the direction of the arrow by mechanism which does not form a part of the present invention. An inclined guide-plate $c$ is supported by hook $n$ and stays $o$, projecting from the bottom of the tank, and the surface of the guide-plate may be either plain or grooved, as desired. The number of pumps used is regulated by the width of the plates to be coated, and those not required can be thrown out of action by unscrewing the thumb-screws $g$, which connect the pump-rods $f$ to the sockets $e$, which are journaled on the cranked portion of the crank-shaft.

The bottom of the trough $a$ is inclined, to collect sediment and prevent it from getting into the pumps, and the pumps raise the emulsion from a considerable distance below the surface $w$ to avoid air-bubbles.

The device will operate without the guide-plate $c$, but it is preferable to use it.

A roller $h$, supported by cords $i$, spreads the emulsion upon the surface of the plates, and the cords are arranged to come between the edges of the plates, or beyond their outside edges. Brackets $k$ engage with the roller-spindles $j$ and keep the roller in position, at the same time permitting it to move in a vertical direction. The cords $i$ may be dispensed with when the substance to be coated is very thin, like paper, and has a perfectly even surface, and the roller is then accurately adjusted in brackets $k$.

In Fig. 5 the roller $h$ is shown made in separate parts united by an india-rubber cord $t$, secured to eyes $r$. This construction permits the roller to bend and adapt itself to an uneven surface. The parts of the roller are shown pulled apart and are coupled by a socket-joint. The roller may be formed in as many similar separate parts as desirable.

What I claim is—

1. The combination, with the tank, of a series of emulsion-pumps provided with discharge-chutes, a crank for operating said pumps, and a traveling support for the plates, substantially as and for the purpose set forth.

2. The combination, with the tank having an inclined bottom for collecting sediment, of a series of emulsion-pumps having discharge-chutes projecting through the tank-bottom, a crank for operating the pumps, and a traveling support for the plates, substantially as and for the purpose set forth.

3. The combination, with the tank and the crank-shaft, of a series of emulsion-pumps detachably connected to said crank-shaft, whereby plates of different widths may be coated, and a traveling support for the plates, substantially as set forth.

4. The combination, with the series of emulsion-pumps provided with discharge-chutes, of an inclined guide-plate pivotally supported below the chutes, and a traveling support for the plates, substantially as and for the purpose set forth.

5. The combination, with the series of emulsion pumps provided with discharge-chutes, of a distributing-roller for evening the film of emulsion upon the surface of the plates, and a traveling support for the plates, substantially as set forth.

6. A distributing-roller for evening the film of emulsion upon uneven surfaces, formed of sections coupled by an india-rubber cord, substantially as set forth.

7. The combination, with the emulsion-tank and the series of pumps, of the inclined guide-plate pivotally supported below the discharges of said pumps, the distributing-roller supported by cords, for evening the film of emulsion, and a traveling support for the plates, substantially as and for the purpose set forth.

JAMES WILLIAM THOMAS CADETT.

Witnesses:
SHERLEY BOWDON,
*Patent Agent, 33 Southampton Buildings, Holborn, London.*
PERCY K. WOODWARD,
*Notaries' Clerk, 17 Gracechurch Street, London, E. C.*